United States Patent
Song et al.

(10) Patent No.: US 9,350,611 B2
(45) Date of Patent: May 24, 2016

(54) APPARATUS AND METHOD FOR LOCATING A TARGET OPERATION OBJECT

(71) Applicant: Huawei Device Co., Ltd., Shenzhen, Guangdong (CN)

(72) Inventors: Yue Song, Shenzhen (CN); Rui Wang, Shenzhen (CN); Haitao Liu, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/632,098

(22) Filed: Feb. 26, 2015

(65) Prior Publication Data

US 2015/0172108 A1    Jun. 18, 2015

Related U.S. Application Data

(63) Continuation of application No. 14/230,334, filed on Mar. 31, 2014, now Pat. No. 9,009,278, which is a continuation of application No. 13/116,789, filed on May 26, 2011, now Pat. No. 8,732,280, which is a continuation of application No. PCT/CN2009/074865, filed on Nov. 9, 2009.

(30) Foreign Application Priority Data

Nov. 27, 2008 (CN) .......................... 2008 1 0181563

(51) Int. Cl.
*G06F 15/16*    (2006.01)
*H04L 12/24*    (2006.01)
*H04L 29/08*    (2006.01)

(52) U.S. Cl.
CPC ........ *H04L 41/082* (2013.01); *H04L 29/08072* (2013.01); *H04L 41/00* (2013.01); *H04L 41/0213* (2013.01); *H04L 41/0233* (2013.01); *H04L 41/0813* (2013.01)

(58) Field of Classification Search
CPC ..................... H04L 29/08072; H04L 29/06
USPC .................... 709/203, 220, 224, 228
See application file for complete search history.

(56) References Cited

U.S. PATENT DOCUMENTS

| 6,247,117 B1 | 6/2001 | Juffa |
| 7,734,728 B2 | 6/2010 | Sahinoja et al. |

(Continued)

FOREIGN PATENT DOCUMENTS

| CN | 1885986 A | 12/2006 |
| CN | 1983962 A | 6/2007 |

(Continued)

OTHER PUBLICATIONS

Open Mobile Alliance, "SyncML Device Management Standardised Objects", Version 1.1, Feb. 15, 2002, total 37 pages.

(Continued)

*Primary Examiner* — Khanh Dinh
(74) *Attorney, Agent, or Firm* — Huawei Device Co., Ltd.

(57) ABSTRACT

A method and apparatus for locating a target operation object in a Device Management (DM) system. In one embodiment, the DM system includes a DM server and a DM client. The DM server is configured to send a Delete command to the DM client, wherein the Delete command comprises MO location information for identifying an MO, and feature node information for identifying an MO instance of the MO and wherein a Target element is not included in the Delete command. The DM client is configured to: receive the Delete command; after receiving the Delete command, determine an absolute Uniform Resource Identifier (URI) of a root node of the MO instance according to the MO location information and the feature node information, wherein the absolute URI starts from a root node of a management tree; locate the root node of the MO instance according to the absolute URI of the root node of the MO instance; and delete the root node of the MO instance.

5 Claims, 9 Drawing Sheets

(56) References Cited

U.S. PATENT DOCUMENTS

| | | | |
|---|---|---|---|
| 7,953,836 B2 * | 5/2011 | He | H04L 41/0803 370/401 |
| 8,214,824 B2 | 7/2012 | Ookuma | |
| 8,356,094 B2 | 1/2013 | He et al. | |
| 8,438,616 B2 | 5/2013 | Chai et al. | |
| 8,484,719 B2 | 7/2013 | Nakatomi | |
| 8,700,757 B2 * | 4/2014 | He | H04L 41/0803 370/401 |
| 8,707,386 B2 | 4/2014 | Igakura | |
| 8,732,280 B2 * | 5/2014 | Song | H04L 41/0213 709/220 |
| 8,868,702 B2 | 10/2014 | Kawamura et al. | |
| 9,009,278 B2 * | 4/2015 | Song | H04L 41/0213 709/220 |
| 9,009,306 B2 * | 4/2015 | He | 707/999.003 |
| 2004/0109454 A1 | 6/2004 | Sahinoja et al. | |
| 2004/0225731 A1 | 11/2004 | Piispanen et al. | |
| 2005/0010585 A1 | 1/2005 | Sahinoja et al. | |
| 2006/0190608 A1 | 8/2006 | Sahinoja et al. | |
| 2008/0114570 A1 | 5/2008 | Li et al. | |
| 2008/0189404 A1 | 8/2008 | He et al. | |
| 2008/0317006 A1 | 12/2008 | Li et al. | |
| 2009/0094363 A1 | 4/2009 | He et al. | |
| 2009/0241021 A1 | 9/2009 | Naganuma | |
| 2010/0019906 A1 | 1/2010 | Kushida et al. | |
| 2010/0299739 A1 | 11/2010 | Chai et al. | |
| 2011/0231538 A1 * | 9/2011 | He | H04L 41/0803 709/223 |
| 2014/0173083 A1 | 6/2014 | He et al. | |

FOREIGN PATENT DOCUMENTS

| | | |
|---|---|---|
| CN | 101083608 A | 12/2007 |
| CN | 101123794 A | 2/2008 |
| CN | 101141306 A | 3/2008 |
| EP | 1981210 A1 | 10/2008 |
| EP | 2051440 A1 | 4/2009 |
| JP | 2009524370 A | 6/2009 |
| JP | 2010500792 A | 1/2010 |
| KR | 20060114660 A | 11/2006 |
| KR | 20080057277 A | 6/2008 |
| WO | 2007085178 A1 | 8/2007 |
| WO | 2008014647 A1 | 2/2008 |
| WO | 2008019556 A1 | 2/2008 |

OTHER PUBLICATIONS

Open Mobile Alliance:"OMA Device Management Bootstrap", Candidate Version 1.2, XP002434768, Jun. 2, 2006, total 28 pages.

OMA:"OMA Device Management Tree and Description", Approved Version 1.2, XP002624032, Feb. 9, 2007, total 48 pages.

Motorola et al:"SyncML Representation Protocol,Version 1.0. 1",XP002977306, Jun. 15, 2001, total 105 pages.

Open Mobile Alliance:"SyncML Device Management Tree and Description", Version 1.1.2, Approved version 02, dated Dec. 2, 2003, total 44 pages.

Open Mobile Alliance:"OMA Device Management Protocol", Draft Version 1.3—Oct. 15, 2008, total 53 pages.

Xinmiao Chang et al:"Adding SCR entries to Sessionless TS", Open Mobile Alliance, dated Jan. 27, 2010, total 2 pages.

Den Yu et al: "DM 1.3 Relative URI Enhancement", Open Mobile Alliance, dated Jan. 28, 2010, total 4 pages.

Xinmiao Chang et al:"Relative URI Addressing", Open Mobile Alliance, dated Nov. 16, 2009, total 3 pages.

* cited by examiner

APPARATUS AND METHOD FOR LOCATING A TARGET OPERATION OBJECT

CROSS-REFERENCE TO RELATED APPLICATIONS

This application is a continuation of U.S. patent application Ser. No. 14/230,334, filed on Mar. 31, 2014, which is a continuation of U.S. patent application Ser. No. 13/116,789, filed on May 26, 2011, which is a continuation-in-part of International Application No. PCT/CN2009/074865, filed on Nov. 9, 2009, which claims priority to Chinese Patent Application No. 200810181563.X, filed on Nov. 27, 2008, all of which are hereby incorporated by reference in their entireties.

FIELD

The present disclosure relates to the field of communications, in particular, to device management (DM) technologies in communication systems, and more particularly to an apparatus and method for locating a target operation object.

BACKGROUND

Open Mobile Alliance Device Management Version 1.2 (OMA DM V1.2) is a unified DM specification specified by the OMA DM Working Group for DM. A DM system provides a low cost solution that may be used by a third party to manage and set an environment and configuration information of wireless network terminal devices (such as mobile phone terminals and functional objects in terminals), solve problems occurring during the use of the network devices, install and update software and firmware in an over the air (OTA) manner, and provide more humanized and personalized services, so as to improve the user experience. The third party may be a mobile operator, a service provider, or an information management department of a partner.

FIG. 1 is an architecture diagram of a conventional OMA DM system. A DM agent in a terminal device may be configured to interpret and execute a management command sent by a DM server. A management tree stored in the terminal device may be regarded as an interface, through which the DM Server manages the terminal device according to a DM protocol. The management tree may include some basic Management Objects (MOs). The DM server achieves the objective of controlling the terminal MOs by operating management tree objects. Operation commands may include Get, Replace, Exec, Copy, and Delete.

An MO typically has its own identifier, which is referred to as a Management Object Identifier (MOI) and is used to uniquely identify the MO.

For the DM management tree, the MOs consist of nodes, such as a root node, internal nodes, and leaf nodes. The root node is the topmost node in the management tree. The leaf node may have a node value, but cannot have any child node. The internal node cannot contain a node value, but may have child nodes. However, a topmost node of an MO or in a management sub-tree may also be referred to as a root node of the MO or the management sub-tree. Addressing of nodes is performed through Uniform Resource Identifiers (URIs). The URIs are categorized into absolute URIs and relative URIs. Typically, the absolute URI is a URI starting from the root node, for example "./A/B/C/D", and the relative URI is a URI using some position as a reference, for example "A/B/C/D".

In the management tree, unnamed nodes may exist. These unnamed nodes act as placeholders and are only named when being instantiated by a server or a user terminal. Nodes of this type are referred to as "x" nodes. After being named, the node and sub-nodes under the node are referred to as instances. If the node is the root node of an MO, the node and the sub-nodes under the node are referred to as MO instances.

The OMA DM defines a Device Management Account (DMAcc) standard MO, which stores the relevant parameters required when a user terminal and a server establishes a connection, such as connection reference, a server address, and authentication information.

The OMA DM also defines an Inbox standard MO. By using the object, when a server adds an MO to a user terminal, an absolute path for the adding may not be provided, and the user terminal is informed of an MOI, so that the user terminal resolves a path of the object.

The premise of managing a user terminal by the DM server is that the DM server needs to know relevant information of a management tree in the current user terminal, such as positions, names, and node values of nodes. Sometimes, the user terminal does not inform the server of the information, and the information of multiple terminals may be different.

Conventionally, an MO instance is located by using a relative URI and adding MOI information to a management command. The problem with this technique is that it is based on the premise that relative URIs in multiple terminals are consistent. However, if the relative URIs in the terminals are inconsistent, this technique cannot be applied.

SUMMARY

Embodiments of the present invention provide a method and apparatus for locating a target operation object in a Device Management (DM) system.

In one embodiment of the present invention, there is provided a communication system including a Device Management (DM) server and a DM client. The DM server is configured to send a Delete command to the DM client, wherein the Delete command comprises Management Object (MO) location information for identifying an MO, and feature node information for identifying an MO instance of the MO, and wherein a Target element is not included in the Delete command. The DM client is configured to: receive the Delete command from the DM server; after receiving the Delete command, determine an absolute Uniform Resource Identifier (URI) of a root node of the MO instance according to the MO location information and the feature node information, wherein the absolute URI of the root node of the MO instance starts from a root node of a management tree; locate the root node of the MO instance according to the absolute URI of the root node of the MO instance; and delete the root node of the MO instance.

BRIEF DESCRIPTION OF THE DRAWINGS

The accompanying drawings described herein are for further understanding of the present invention, and a part of this application, but not intended to limit the present invention. Among the accompanying drawings.

DETAILED DESCRIPTION OF THE EMBODIMENTS

To make the objectives, technical solutions, and advantages of the present invention more comprehensible, the present invention is described in further detail below with reference to the embodiments and the accompanying drawings. The exemplary embodiments of the present invention and the descriptions of the embodiments herein are for explaining the present invention, but are not intended to limit the present invention.

Embodiments of the present invention provide a DM server, a DM client, and a method for locating a target operation object are provided, which are described in detail in the following with reference to the accompanying drawings.

Figure 1:
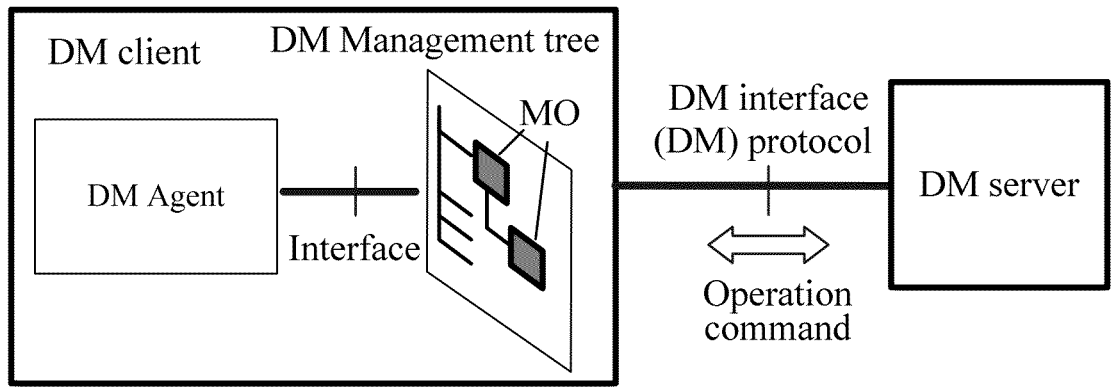
FIG. 1 is an architecture diagram of an OMA DM system in the prior art.
Figure 2:
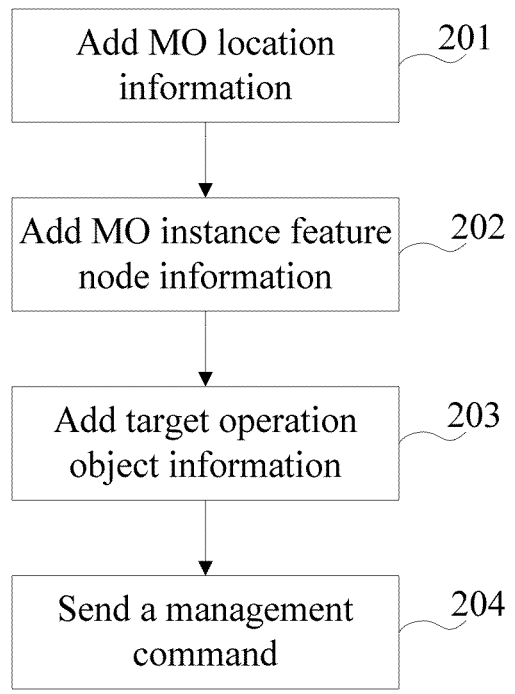
FIG. 2 is a flow chart of a first embodiment of a DM server sending a DM command according to an embodiment of the present invention.

FIG. 2 is a flow chart of a first embodiment of a DM server sending a DM command according to an embodiment of the present invention, which includes the following steps.

Step 201: Add MO location information into a management command sent by a DM server. The MO location information uniquely identifies an MO and is used for a terminal find the MO to be operated according to the identification information.

Step 202: Add MO instance feature node information into the management command sent by the DM server. The MO instance feature node information uniquely identifies an MO instance, so that a DM client may find a position (URI) of the MO instance according to the MO instance feature node information.

Step 203: Add target operation object information into the management command sent by the DM server. The target operation object information includes information of a Tree aNd Description Serialization (TNDS) object or a target operation node.

The target operation node information is used for the DM client to find, according to the target operation node information, a node to be operated.

Step 204: Send the management command.

The sequence of steps 201, 202, and 203 in the embodiment of the present invention is not limited, and the sequence described in this embodiment is just a special case.

Figure 3:
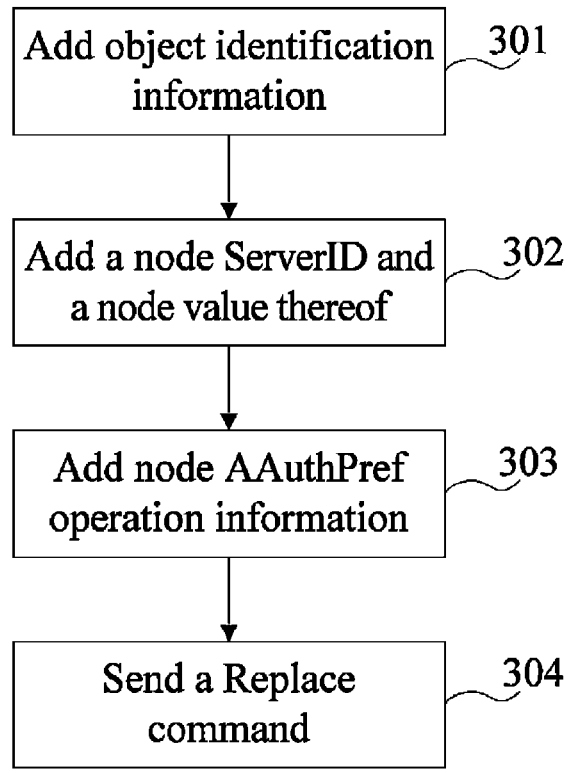
FIG. 3 is a flow chart of a second embodiment of a DM server sending a DM command according to an embodiment of the present invention.

FIG. 3 is a flow chart of a second embodiment of a DM server sending a DM command according to an embodiment of the present invention.

Figure 4:
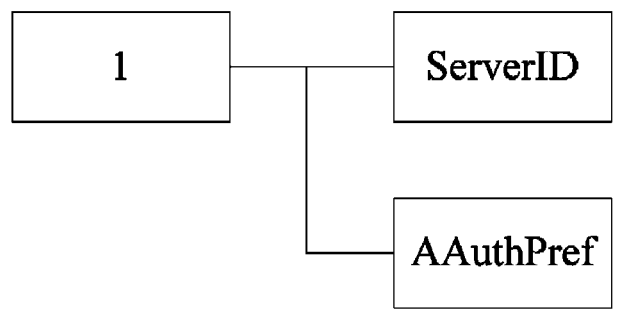
FIG. 4 is a diagram of a first embodiment of a DM tree of an embodiment of the present invention.

In a DM tree, as shown in FIG. 4, a node 1 is a root node of a DMAcc MO, ServerID is a server identifier (server identifiers in each management instance are different), and AAuthPref is a preferred authentication type. If a server needs to set a value of a node AAuthPref, but the server does not know a position of the MO in a terminal management tree, and does not know that the root node of the MO instance is the node 1 either. In such case, a specific position of the node AAuthPref may be inquired by using the MO and the MO instance feature node information, and setting is performed at the same time.

The server uses a Replace command to replace the value of the node AAuthPref. Among Item elements of the Replace command sent by the server, elements TargetParent, Target, and Data are used to carry MO location information, target operation node information, and node data to be replaced to a target node respectively.

Step 301: Use a Management Object Identifier (MOI) as location information of an MO, which is urn:oma:mo:oma-dm-dmacc:1.0 in this embodiment. In embodiments of the present invention, an MOI defined in the existing DM protocol is not limited to be used as location information of an MO, and any information can be used as the location information only if a DM client may find, according to the location information, an object to be operated. In this embodiment, an element LocName is used in the element TargetParent to carry the MOI, but the present invention does not limit the names, types, and the number of the element carrying the MOI and the higher level elements.

In an exemplary embodiment, for example, a newly defined Management Object ID (MOID) element may be used to carry merely an MOI, for example <MOID>urn:oma:mo:oma-dm-dmacc:1.0</MOID>. Meanwhile, the position of the MOI information in a management command is not limited either.

Step 302: Use a feature node and node information of the feature node in the MO as MO instance feature node information, for example, in this embodiment, a node ServerID and a node value www.sonera.fi-8765 of the node ServerID are used as the MO instance feature node information. The feature node and the node information of the feature node may uniquely identify the MO instance in one or more DM clients. In embodiments of the present invention, the node serving as a feature node is not limited, and a node value used as the node information is not limited either. In this embodiment, an element Filter in the Target is used to carry the MO instance feature node information. Specifically, a sub-element Record/Item/Target/LocURI is used to carry a relative URI of the feature node, that is, the node ServerID, and a sub-element Record/Item/Data is used to carry the feature node information, that is, www.sonera.fi-8765. It should be noted that, a base URI of the feature node herein is not a root node of the device, but a root x node of the MO.

In an exemplary embodiment, the present invention does not limit the names, types, and the number of the element carrying the MOI and the higher level elements. For example, only an element MOInstID, such as <MOInstID>ServerID?value=www.sonerafi-8765</MOInstID>, may be used for carrying location information, where ServerID is a feature node, www.sonera.fi-8765 is a value of the feature node. In an exemplary embodiment, a position of the location information in a management command is not limited.

Step 303: An element LocURI in the element Target in this embodiment carries relative URI information of a target operation node, for example, a node AAuthPref in this embodiment. Furthermore, data content for replacement is added into the element Data. It is different from the existing DM protocol in that the base URI of the target operation node is not a root node of the device, but a root node of the MO instance. The root node of the MO instance is located through the MO instance feature node information described above. The specific locating procedure is described in the following.

Step 304: The DM server sends the foregoing Replace command to the DM client.

In an exemplary embodiment, location procedures are arranged according to a sequence in which the elements in the command are arranged. For example, the MO location information in the foregoing example is placed at the front (that is, the information in the element TargetParent). The sequence of the location procedures may also be determined by other auxiliary information. For example, an element SequenceItem is used, into which the MO location information, the MO instance feature node information, and the target operation object information are written, and the element indicates that the processing is performed according to the sequence of the information in the element. The method for determining the sequence of the location procedures herein is also applicable to other parts of the present invention, and is not described again.

Figure 5:
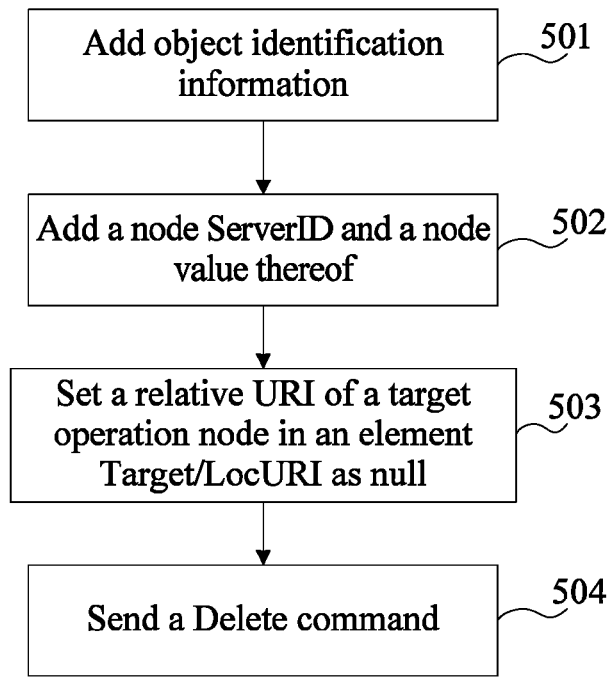
FIG. 5 is a flow chart of a third embodiment of a DM server sending a DM command according to an embodiment of the present invention.

FIG. 5 is a flow chart of a third embodiment of a DM server sending a DM command according to an embodiment of the present invention.

If a server needs to delete an MO instance, for example, a DMAcc MO instance node 1 shown in FIG. 4, corresponding steps are as follows.

Step 501: Write MO location information into an element Item/TargetParent/LocName in a Delete command. The MO location information may also be placed in an element Item/Source/LocURI in the Delete command, which has an advantage that an element Source already supported by an existing protocol (that is, the DM1.2) may be reused, and a terminal does not need to additionally support an element TargetParent that is not supported by the existing protocol, so that the complexity of terminal program design is decreased, and the backward compatibility of the protocol of a new version is improved. An MO identifier is used as MO location information, which is urn:oma:mo:oma-dm-dmacc:1.0 in this embodiment.

Step 502: Write a feature node and node information of the feature node in the MO as MO instance feature node information, for example, in this embodiment, a node ServerID and a node value www.sonera.fi-8765 of the node ServerID are used as the MO instance feature node information. As in the second embodiment, the MO instance feature node information is carried in an element Filter. The MO instance feature node information may also be carried in the element Item/Source/LocURI of the Delete command.

According to the method in step 501, the MO location information and the MO instance feature node information may be carried in the Item/Source/LocURI at the same time. The implementation manner may be as follows:

```
<Delete>
    ...
    <Item>
        <Source>
            <LocURI>
                .?[ urn:oma:mo:oma-dm-dmacc:1.0]/ServerID='
                www.sonera.fi-8765'
            </LocURI>
        </Source>
        ...
    </Item>
</Delete>
```

The "." in the Item/Source/LocURI is a URI, and indicates a root node of a management tree, and may also be other URIs herein. The "?" behind the "." is used to separate the URI before the "?" from the MO location information after the "?". The MO location information herein is an identifier of a DMAcc MO, which is bracketed by "[" and "]". The MO location information is followed by the MO instance feature node information, which is /ServerID='www.sonera.fi-8765' in this embodiment. .?[urn:oma:mo:oma-dm-dmacc:1.0]/ServerID='www.sonera.fi-8765' is used to determine a position of the MO instance whose MO identifier is urn:oma:mo:oma-dm-dmacc:1.0 under the root node of the management tree, and determine an instance whose node value of the ServerID is www.sonera.fi-8765 among the instances.

The advantage of the implementation mode is that the element Source that is already supported by the existing protocol (that is, the DM1.2) may be reused to carry the MO location information and the MO instance feature node information at the same time to locate the MO instance without requiring the terminal to additionally support the element TargetParent and the element Filter that are not supported by the existing protocol, so that the complexity of terminal program design is decreased, and the backward compatibility of the protocol of a new version is improved.

Step 503: A relative URI of a target operation node in an element Target/LocURI is null, which indicates that the node operated by the management command is the root node of the MO instance, that is, a node 1, and at the moment, the whole MO instance is deleted.

In an exemplary embodiment, an element Target not including an element LocURI may also indicate that the node operated by the management command is the root node of the MO instance, and the objective of deleting the whole MO instance of the node 1 is achieved.

If the element Item/Source/LocURI mentioned above is used to carry the MO location information and the MO instance feature node information, when the target operation object information is null or the target operation object information is not included in this step, the information carried in the Item/Source/LocURI may be used to determine the root node (that is, a root node URI) of the MO instance, and determines the root node as a target operation object directly. In this embodiment, the node 1 (that is, the URI of the node 1) is determined as the target operation object, and the node 1 and all sub-nodes of the node 1 are deleted, that is, the whole MO instance is deleted. The whole MO instance may also be regarded as the target operation object.

If the element Item/Source/LocURI carries only the MO location information, and does not carry the MO instance feature node information, it indicates that all MO instances need to be deleted, and the MO instances are determined according to the MO location information. That all MO instances need to be deleted is equal to that one or more MO instances are determined by using the MO information in the element Source and are determined as the target operation object. The element Item/TargetParent mentioned above may also be used to carry the MO location information in the command. Specifically, a sub-element of the element TargetParent, such as LocName or LocURI, may be used to carry the MO location information. The advantages of using the element Source for carrying the MO location information are described above, that is, decreasing the complexity of terminal program design and improving the compatibility among different versions.

In this embodiment, the element Source not only has a function of locating the MO instance, but also has a function of acting as the target operation object. Therefore, when the target operation object information is null or the target operation object information is not included, the terminal does not refuse to process the command sent by the server, and the MO instance determined by the element Source is used as the target operation object. Additionally, in a case that the element Source does not carry the MO instance feature node information, the target operation object may be multiple MO instances determined according to the MO location information, so that the objective of operating (deleting) multiple MO instances with the element Source carrying location information of one MO is achieved.

In addition, when the target operation object information is null or the target operation object information is not included, the Target may also be used directly to carry the above MO location information and MO instance feature node information, or carry only the foregoing MO location information, which may also achieve the same effect of using the element Source to carry the information as described above. In such case, the command may not need to carry the element Source.

Step 504: The DM server sends the foregoing Delete command to the DM client.

Figure 6:
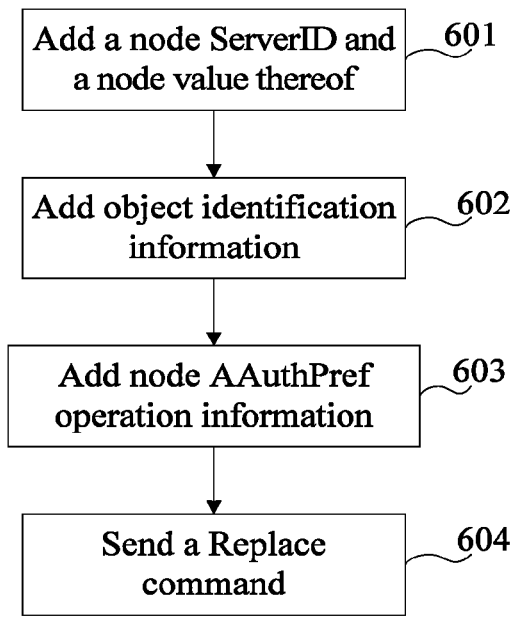
FIG. 6 is a flow chart of a fourth embodiment of a DM server sending a DM command according to an embodiment of the present invention.

FIG. 6 is a flow chart of a fourth embodiment of a DM server sending a DM command according to an embodiment of the present invention.

In this embodiment, the DM server transfers a Replace management command as that in the second embodiment, and a target address in an element Target is a node ./Inbox, which indicates that the server updates an MO instance by using an Inbox function. A DM tree is as shown in FIG. 4.

Step 601: Write the MO instance feature node information into an element Filter of the sent Replace management command (in this embodiment, a feature node is ServerID, and a node value of the feature node is www.sonera.fi-8765), which indicates a node 1 to which a TNDS object included in an element Data of the command needs to be added. An element Item/Data is an MO instance to be updated in the DM tree. <NodeName><NodeName/>indicates that a name of a root node of the MO instance is null. Because the server does not know the specific location information of the instance, the name is not specified.

In an exemplary embodiment, the TNDS object may also include the MO instance feature node information. For example, the TNDS object includes the node ServerID and the node value www.sonera.fi-8765 of the node ServerID. Therefore, in this embodiment, the MO instance feature node information carried alone by using the foregoing element Filter alone may be removed from the management command. After receiving the management command, a DM client extracts the MO instance feature node information from the TNDS object.

Step 602: Add MO location information, that is, an MO identifier, into an element RTProperties/Type of a TNDS object root node.

Step 603: The element Data includes a target operation object to be operated by the management command, that is, the TNDS object, which includes node information to be operated, such as <NodeName>AAuthPref</NodeName>.

Step 604: The DM server sends the foregoing Replace command to the DM client.

In an exemplary embodiment, the Replace management command in this embodiment may not include the element Target, that is, not include the target address.

Figure 7:
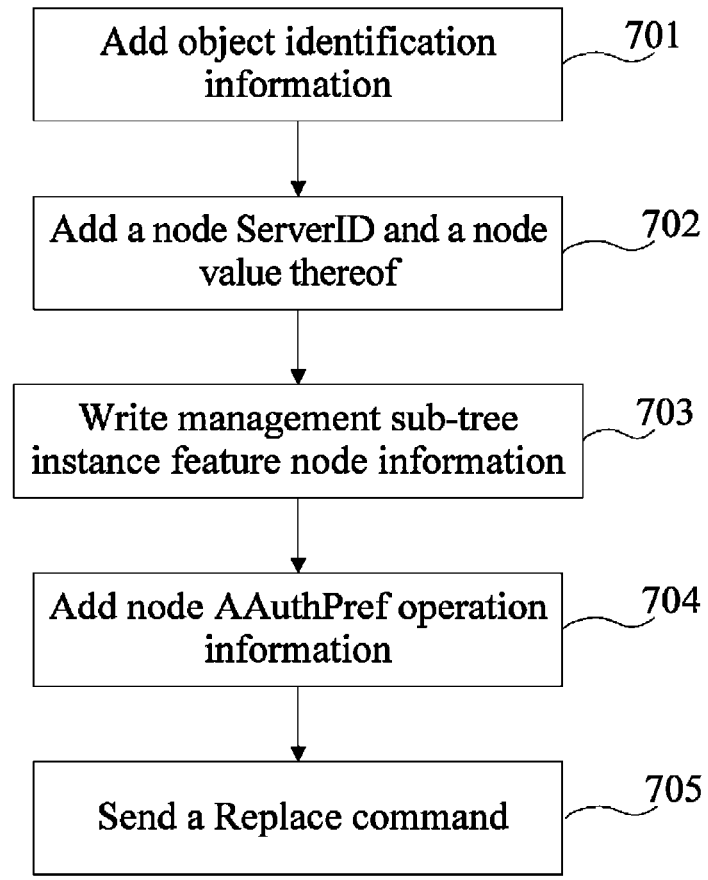
FIG. 7 is a flow chart of a fifth embodiment of a DM server sending a DM command according to an embodiment of the present invention.

FIG. 7 is a flow chart of a fifth embodiment of a DM server sending a DM command according to an embodiment of the present invention.

Figure 8:
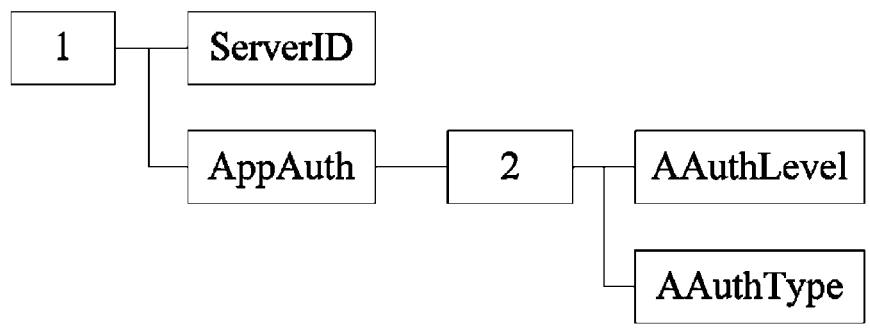
FIG. 8 is a diagram of a second embodiment of a DM tree of an embodiment of the present invention.

A server needs to replace a value of a node AAuthType shown in FIG. 8, but the server does not know the location of the MO in a management tree, does not know that a root node of the MO instance is a node 1, and does not know that a root node of a management sub-tree instance 2 is a node 2. In such case, besides the MO and the MO instance feature node information, management sub-tree instance location information is used. For example, a node AAuthLevel and its node value as shown in FIG. 8 are used to require the specific location of node AAuthType, and replacing is performed at the same time.

Step 701: Write MO location information into an element Item/MOID in a Replace command. An MO identifier (MOID) is used as the MO location information, which is um:oma:mo:oma-dm-dmacc:1.0 in this embodiment.

Step 702: Write the MO instance feature node information into an element Item/MOInstID, that is, the feature node and the node value of the feature node, which is <MOInstID>ServerID?value=www.sonerafi-8765</MOInstID> in this embodiment. In this embodiment, ServerID is the feature node, and www.sonera.fi-8765 is the node value of the feature node.

Step 703: Write management sub-tree instance feature node information into an element Item/SubMOInstID. That is, write the feature node in the sub-tree and the node value of the feature node into the element Item/SubMOInstID, which is <SubMOInstID>AAuthLevel?value=SRVCRED</SubMOInstID> in this embodiment, where AAuthLevel is the feature node of the sub-tree, and SRVCRED is the node value of the feature node AAuthLevel.

Step 704: Write a relative URI of a target operation node into an element Target/LocURI, which is <Target><LocURI>AAuthType</LocURI></Target> in this embodiment, and the operation node is AAuthType. HTTPBASIC is written into an element Data as the data used for replacement.

Step 705: The DM server sends the foregoing Replace command to a DM client.

In an exemplary embodiment, multiple pieces of the management sub-tree instance location information may exist, that is, multiple SubMOInstIDs may exist, which are used to locate management sub-tree instances of lower levels. The present invention does not limit the position of the elements in the management command. For example, the elements maybe put in the element Target.

Figure 9:
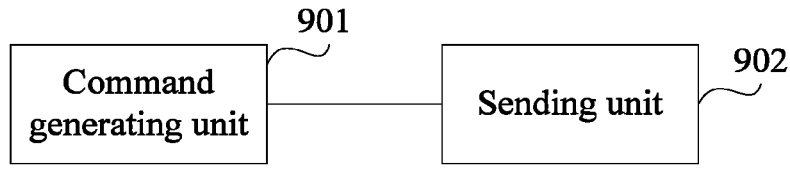
FIG. 9 is an architecture diagram of an embodiment of an apparatus for a DM server sending a DM command according to an embodiment of the present invention.

FIG. 9 is an architecture diagram of an embodiment of an apparatus for a DM server sending a DM command according to an embodiment of the present invention.

The DM server includes a command generating unit 901 and a sending unit 902.

The command generating unit 901 is configured to add MO location information, MO instance feature node information, and target operation object information into a management command. The sending unit 902 is configured to send the foregoing management command through the sending unit.

The command generating unit 901 adds the MO location information into the management command sent by the server. The MO location information is used to uniquely identify an MO, so that a terminal may find the MO according to the identification information. The command generating unit 901 also adds the MO instance feature node information into the management command sent by the server, and the MO instance feature node information includes information that uniquely identifies an MO instance, so that the terminal may find the MO instance according to the MO instance feature node information. The command generating unit 901 also adds the target operation object information into the management command sent by the server, and the target operation object information includes target operation node information and TNDS object information, so that the terminal may find, according to the target operation node information, a node to be operated, or find, according to the TNDS object information, a management sub-tree instance to be operated. The management command is sent by the sending unit 902.

Figure 10:
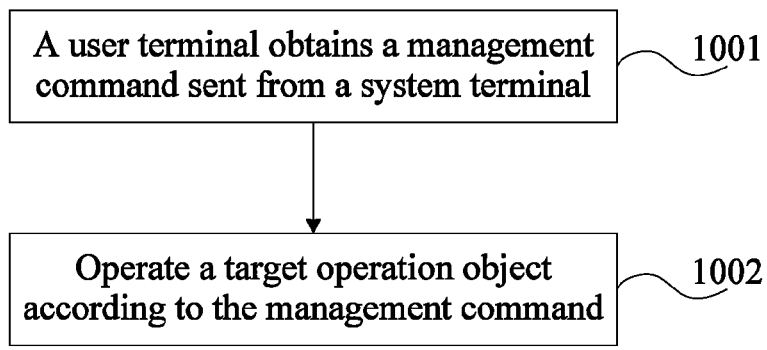
FIG. 10 is a flow chart of a first embodiment of a DM client locating a target operation object according to a DM command according to an embodiment of the present invention.

FIG. 10 is a flow chart of a first embodiment of a DM client locating a target operation object according to a DM command according to an embodiment of the present invention.

Step 1001: Obtain a management command sent by a DM server, in which the management command includes MO location information, MO instance feature node information, and target operation object information.

Step 1002: Operate a target operation object according to the management command.

In the foregoing embodiment, different DM clients may locate a target operation object according to the same DM command.

Figure 11:
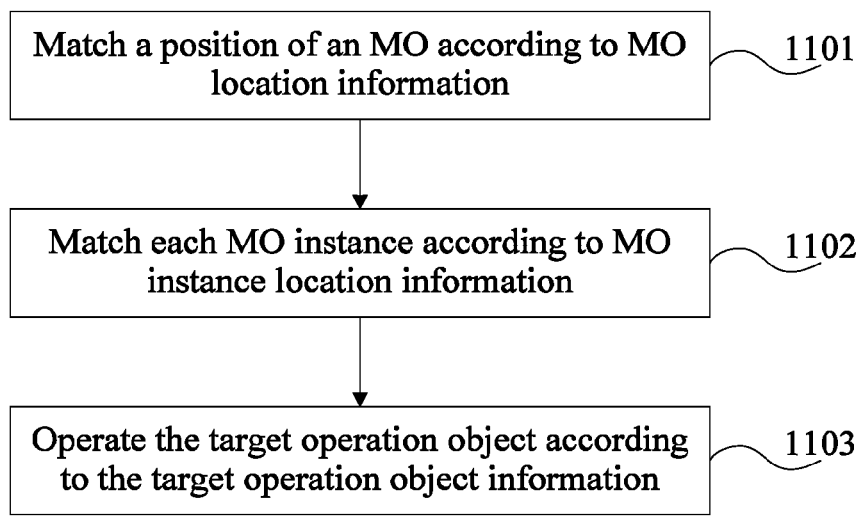
FIG. 11 is a flow chart of a specific embodiment of step 1002 of the process that a DM client locates a target operation object according to an embodiment of the present invention.

FIG. 11 is a flow chart of a specific embodiment of step 1002 of the process that the DM client locates the target operation object according to an embodiment of the present invention.

Step 1101: Obtain a first URI of an MO instance root node matched with the MO location information.

Step 1102: Match the MO instance feature node information with feature node information of an MO instance corresponding to the first URI (that is, the matching is performed by using a feature node and a node value of the feature node). A second URI of an MO instance root node corresponding to a successfully matched feature node is obtained.

Step 1103: Operate the target operation object according to the target operation object information in the management command and the second URI.

In an exemplary embodiment, in step 1101, if the DM client directly stores mapping information between MO identifiers and MO positions, and mapping information between the MO positions and MO instances, location procedures are different, and the DM client may directly find a corresponding parent node URI in the mapping information. For example, Table 1 shows URIs of parent nodes where MOs are located and corresponding MO instances.

TABLE 1

| MO identification information | Parent node URL | MO instance |
|---|---|---|
| urn:oma:mo:oma-dm-dmacc:1.0 | ./MngmtSvr | 1 |
| urn:oma:mo:oma-dm-dmacc:1.0 | ./MngmtSvr | 2 |
| urn:oma:mo:oma-scomo:1.0 | ./Application/Software | 2 |
| urn:oma:mo:oma-scomo:1.0 | ./Application/Software | 3 |
| urn:oma:mo:oma-lawmo:1.0 | ./Mngmet/LockAndWipe | 1 |

In an exemplary embodiment, the target operation object includes a target operation node and a TNDS object.

Figure 12:
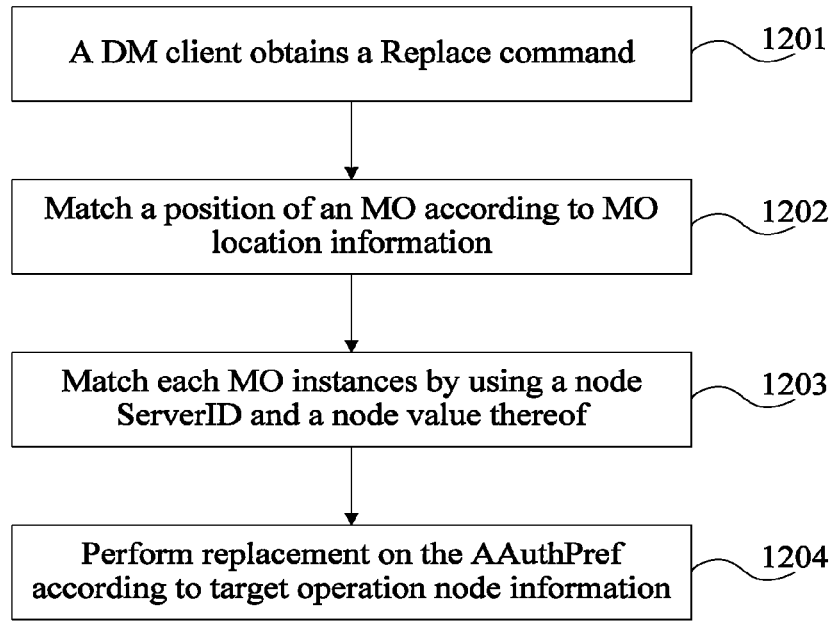
FIG. 12 is a flow chart of a second embodiment of a DM client locating a target operation object according to a DM command according to an embodiment of the present invention.

FIG. 12 is a flow chart of a second embodiment of a DM client locating a target operation object according to a DM command according to an embodiment of the present invention.

For a Replace management command sent by a DM server, a DM tree of the DM client is as shown in FIG. 4, and performs the following processing which includes the following steps.

Step 1201: The DM client receives the Replace command.

Step 1202: Match a position of a DMAcc MO in the DM tree of the DM client. In this embodiment, the matching is performed by using MO location information, which is urn: oma:mo:oma-dm-dmacc:1.0. The number of matched MO instances is N (N>0). For example, root nodes of the MO instances are nodes 1, 2, and 3. The DM client obtains URIs (that is, the first URIs) of the instance root nodes.

Step 1203: The DM client matches each of the MO instances by using MO instance feature node information according to the URIs, that is, match a feature node ServerID in each of the instances, so as to judge whether a node value of the node ServerID is equal to www.sonera.fi-8765, and if yes, the DM client obtains an MO instance root node corresponding to the node, which is a node 1 in this embodiment. The DM client obtains a URI of the node 1 (that is, the second URI).

Step 1204: The DM client uses the URI of the node 1 as a reference and operates a target operation node AAuthPref of the DM tree of the DM client. That is, the URI of the node 1 is connected to a relative URI of the target operation node, and then replacement operation is performed to replace a value of the original node AAuthPref with content in an element Data in the Replace command.

In an exemplary embodiment, for the steps 1202 and 1203, when parsing the operation command, the DM client determines a sequence of location procedures according to an arrangement sequence of the elements in the command. For example, in the foregoing example, the MO location information is arranged at the utmost front (that is, information in an element TargetParent), and is processed by the terminal first, that is, step 1202, and therefore the objective of locating the MO first is achieved. The sequence of the location procedures may also be determined through other auxiliary information. For example, an element SequenceItem may be used in the management command from which the MO location information, the MO instance feature node information, and the target operation object information are obtained in the element, and the terminal may process the location information in sequence. The method for determining the sequence of the location procedures herein is also applicable to other parts of the present invention, and is not discussed again.

Figure 13:
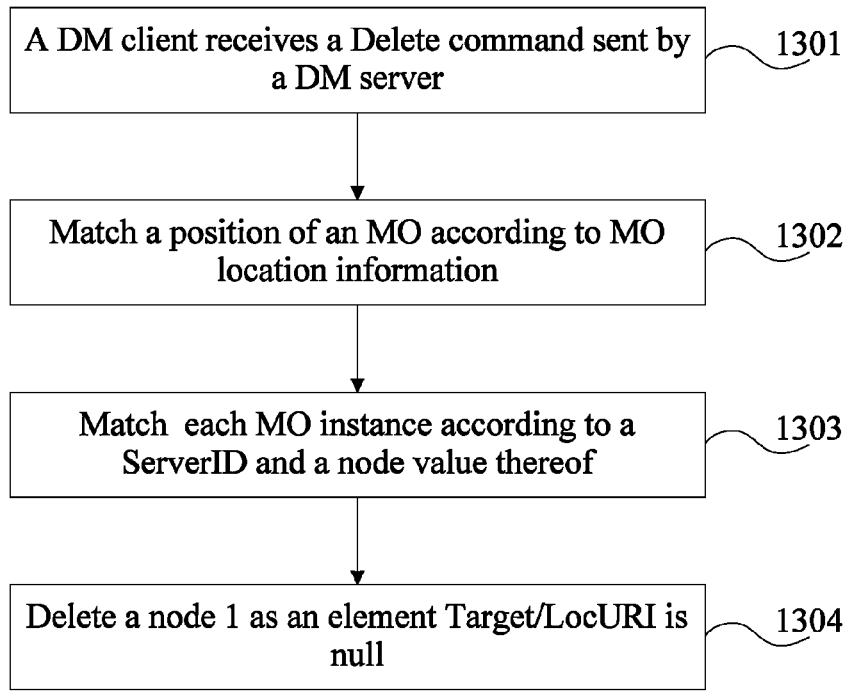
FIG. 13 is a flow chart of a third embodiment of a DM client locating a target operation object according to a DM command according to an embodiment of the present invention.

FIG. 13 is a flow chart of a third embodiment of a DM client locating a target operation object according to a DM command according to an embodiment of the present invention.

If the server needs to delete one MO instance, for example, a DMAcc MO instance 1 in FIG. 4, the DM client performs the following processing steps.

Step 1301: The DM client receives the Delete command.

Step 1302: Match a position of a DMAcc MO in the DM tree of the DM client. In this embodiment, the matching is performed by using MO location information, which is urn: oma:mo:oma-dm-dmacc:1.0. The number of matched MO instances is N (N>0). For example, root nodes of the MO instances are nodes 1, 2, and 3. The DM client obtains URIs of the instance root nodes.

In a command received by the DM client, the MO location information may be carried in an element TargetParent mentioned in the present invention, or may be placed in an element Item/Source/LocURI mentioned in a foregoing embodiment. Therefore, the DM client locates the MO according to information in an element Source. The advantage is that the element Source already supported by the existing protocol (that is, the DM1.2) may be reused, without requiring the terminal to additionally support the element TargetParent which is not supported by the existing protocol, so that the complexity of terminal program design is decreased, and the backward compatibility of the protocol of a new version is improved.

Step 1303: The DM client matches each of the MO instances by using MO instance feature node information according to the URIs, that is, perform the matching on a feature node ServerID in each of the instances, so as to judge whether a node value of the node ServerID is equal to www-.sonera.fi-8765 and if yes, the DM client obtains an MO instance root node corresponding to the node, which is a node 1 in this embodiment. The DM client obtains a URI of the node 1.

As described in the third embodiment of the present invention, if the MO feature node information is carried in the element Item/Source/LocURI in the command, the DM client obtains the information from the element Source to locate the MO instance. The advantage is that the element Source already supported by the existing protocol (that is, the DM1.2) may be reused to carry the MO instance feature node information, so as to locate the MO instance without requiring the terminal to additionally support an element Filter which is not supported by the existing protocol, so that the complexity of terminal program design is decreased, and the backward compatibility of the protocol of a new version is improved.

Step 1304: The DM client uses the URI of the node 1 as a reference. Because an element Target/LocURI is null, which indicates that the node operated by the management command Delete is the root node of the MO instance, a target operation node 1 of the DM tree of the DM client is deleted in this step, and at the moment, the node 1 and sub-nodes of the node 1 of the whole MO instance are deleted.

In an exemplary embodiment, as for an element Target not including an element LocURI, the node 1 and the sub-nodes of the node 1 may also be deleted.

In this embodiment, in the command received by the DM client, if the element Item/Source/LocURI mentioned above is used to carry the MO location information and the MO instance feature node information if the target operation object information is null or the target operation object information is not included in this step, the DM client uses the information carried in the Item/Source/LocURI to determine the root node of the MO instance (that is, a root node URI), and determines the root node as a target operation object directly. In this embodiment, the node 1 (that is, the URI of the node 1) is determined as the target operation object, and then the node 1 and all of the sub-nodes of the node 1 are deleted, that is, the whole MO instance is deleted. The whole MO instance may also be regarded as the target operation object.

If the element Item/Source/LocURI includes only the MO location information, and does not include the MO instance feature node information, it indicates that all MO instances need to be deleted, and the MO instances are MO instances determined according to the MO location information, for example, the MO instances corresponding to the nodes 1, 2, and 3 mentioned above. At the moment, the DM client deletes all of the determined MO instances. It is equal to that the MO information in the element Source is used to determine multiple MO instances, and the MO instances are determined as the target operation object. In this case, the number of the MO instance determined through the MO location information may be only one. The element Item/TargetParent mentioned above may also be used to carry the MO location information in the command. Specifically, a sub-element of the element TargetParent, such as LocName or LocURI, may also be used for carrying the MO location information. At the moment, the DM client determines the MO instance according to information in the element TargetParent. The advantages of using the element Source for carrying are described above, that is, decreasing the complexity of terminal program design and improving the compatibility among different versions.

In this embodiment, the element Source not only has a function of locating the MO instance, but also has a function of acting as the target operation object. Therefore, when the target operation object information is null or the target operation object information is not included, the client does not refuse to process the command sent by the server, and the MO instance determined by the element Source is determined as the target operation object. Additionally, if the element Source does not carry the MO instance feature node information, the client regards multiple MO instances determined according to the MO location information as the target operation object, so that the objective of operating (deleting) multiple MO instances with the element Source carrying location information of one MO is achieved.

Furthermore, if the client finds that the element Source does not exist in the received command, and the element Target includes the MO location information and the MO instance feature node information, the DM client determines the root node (that is, the root node URI) of the MO instance through the information in the element Target (that is, the root node URI), for example, the node 1, and then deletes the node 1 and all of the sub-nodes of the node 1, that is, the whole MO instance is deleted. Alternatively, if the element Target only includes the MO location information, the DM client determines all MO instance root nodes (that is, root node URIs) according to the information (that is, root node URIs), for example the nodes 1, 2, and 3 mentioned above, and then deletes all of the determined MO instance root nodes and all sub-nodes of the MO instance root nodes.

Figure 14:
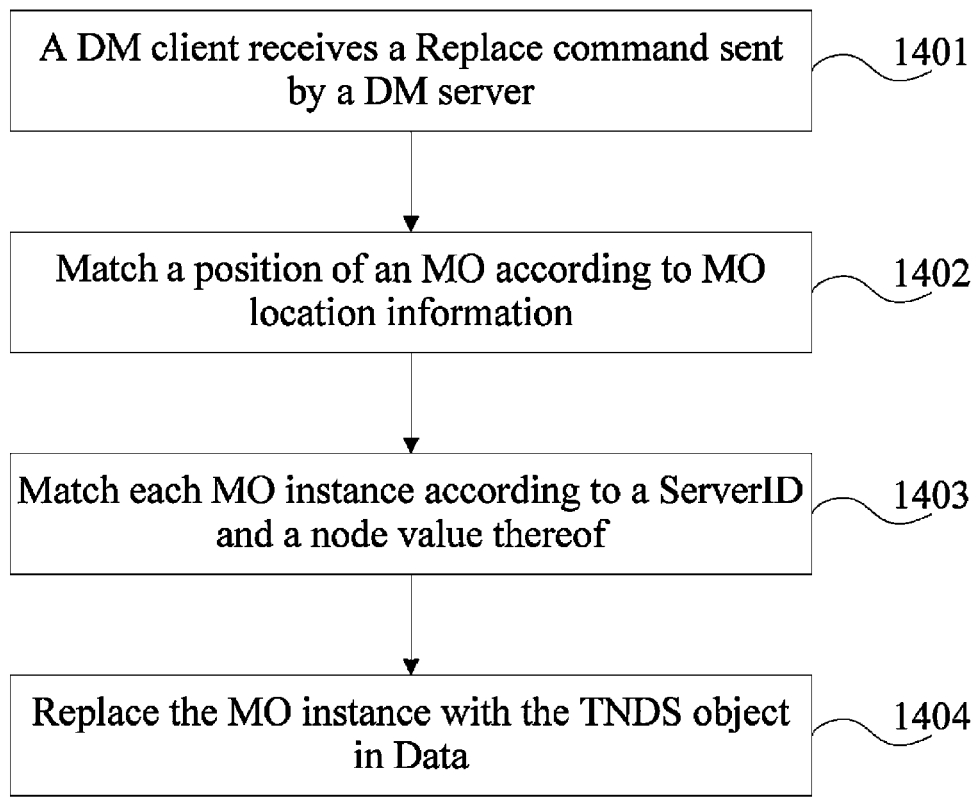
FIG. 14 is a flow chart of a fourth embodiment of a DM client locating a target operation object according to a DM command according to an embodiment of the present invention.

FIG. 14 is a flow chart of a fourth embodiment of a DM client locating a target operation object according to a DM command according to an embodiment of the present invention.

In this embodiment, a DM client receives a Replace management command as that in the second embodiment in which the DM client receives the management command, and a target address in an element Target is a node ./Inbox, which means that the DM client updates an MO instance through a management command sent to an inbox. A DM tree of the DM client is as shown FIG. 4.

Step 1401: The DM client receives the Replace command.

Step 1402: Match a position of a DMAcc MO in the DM tree of the DM client. In this embodiment, the matching is performed by using MO location information, which is urn: oma:mo:oma-dm-dmacc:1.0. The number of matched MO instances is N (N>0). For example, root nodes of the MO instances are nodes 1, 2, and 3. The DM client obtains URIs of the instance root nodes.

Step 1403: The DM client matches each of the MO instances by using MO instance feature node information according to the URIs, that is, the matching is performed on a feature node ServerID in each of the instances, so as to judge whether a node value of the node ServerID is equal to www-.sonera.fi-8765, and if yes, the DM client obtains an MO instance root node corresponding to the node, which is a node 1 in this embodiment. The DM client obtains a URI of the node 1. A TNDS object includes the MO instance feature node information.

Step 1404: The DM client uses the URI of the node 1 as a reference, and replaces an MO instance corresponding to a successfully matched feature node with the TNDS object in the Data.

In an exemplary embodiment, the management command in this embodiment does not include the element Target, that is, does not include a target address, and the foregoing functions of location and replacement may also be implemented.

Figure 15:
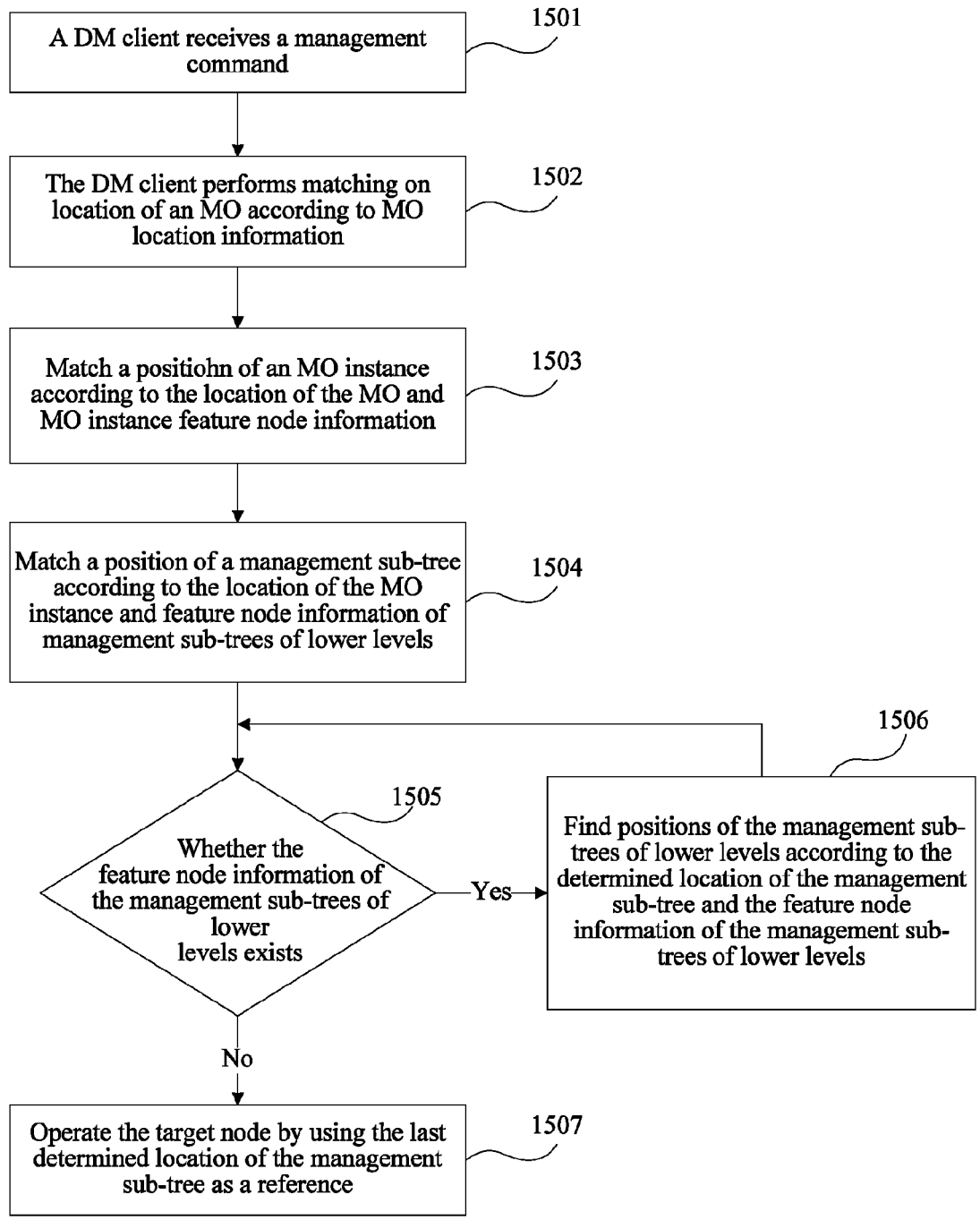
FIG. 15 is a flow chart of a fifth embodiment of a DM client locating a target operation object according to a DM command according to an embodiment of the present invention.

FIG. 15 is a flow chart of a fifth embodiment of a DM client locating a target operation object according to a DM command according to an embodiment of the present invention.

A DM tree of a DM client is as shown in FIG. 8. The DM client receives a corresponding management command from a DM server, which in this embodiment is a Replace command, for replacing a value of a node AAuthType.

Step 1501: The DM client receives the Replace command.

Step 1502: Match a position of a DMAcc MO in the DM tree of the DM client. In this embodiment, the matching is performed by using MO location information in an element MOID, which is urn:oma:mo:oma-dm-dmacc:1.0. The number of matched MO instances is N (N>0). For example, root nodes of the MO instances are nodes 1 and 3. The DM client obtains URIs of the instance root nodes.

Step 1503: The DM client then matches each of the MO instances by using MO instance feature node information in an element MOInstID according to the URIs. In this embodiment, the matching is performed on a feature node ServerID in each of the instances, so as to judge whether a node value of the node ServerID is equal to www.sonera.fi-8765, and if yes, the DM client obtains an MO instance root node corresponding to the node, which is a node 1 in this embodiment. The DM client obtains a URI of the node 1.

Step 1504: According to a URI of an MO instance 1, the DM client uses location information of management sub-tree instances in an element SubMOInstID to match each of the management sub-tree instances according to a URI of an MO instance 1, that is, the matching is performed on a feature node AAuthLevel in each of the sub-trees, so as to judge whether a node value of the node AAuthlevel is equal to SRVCRED, and if yes, the DM client obtains a root node of a management sub-tree instance corresponding to the node AAuthLevel, which is a node 2 at the moment. The DM client obtains a URI of the node 2.

Step 1505: Judge whether location information of management sub-tree instances of lower levels also exists, and if yes, the procedure proceeds to step 1506; otherwise, the procedure proceeds to step 1507.

Step 1506: Find positions of the management sub-tree instances of lower levels according to the determined management sub-tree instance URI and feature node information of the management sub-tree instance of the lower levels. The DM client then uses feature node information of the management sub-tree instance in a next element SubMOInstID to match each of the management sub-tree instances of the lower levels, that is, the matching is performed on a feature node in each of the management sub-tree instances of lower levels, so as to judge whether a node value of the feature node is equal to a preset node value, and if yes, the DM client obtains a root node of a management sub-tree instance corresponding to the node, and obtains a URI of a root node of a management sub-tree instance corresponding to a successfully matched feature node. Then, the procedure returns to step 1505.

Step 1507: The DM client uses the URI of the node 2 as a reference to operate the target operation node AauthType in this embodiment, that is, to connect the URI of the node 2 to a relative URI of the target operation node, and then performs replacement.

Figure 16:
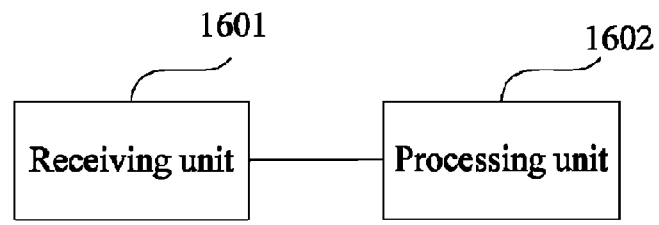
FIG. 16 is an architecture diagram of an embodiment of an apparatus for receiving a DM command according to an embodiment of the present invention.

FIG. 16 is an architecture diagram of a DM client according to an embodiment of the present invention.

The DM client includes a receiving unit 1601 and a processing unit 1602.

The receiving unit 1601 is configured to receive a management command sent by a DM server, in which the management command includes MO location information, MO instance feature node information, and target operation object information.

The processing unit 1602 is configured to operate a target operation object according to the management command.

In the foregoing embodiment, different DM clients may locate a target operation object according to the same DM command.

Figure 17:
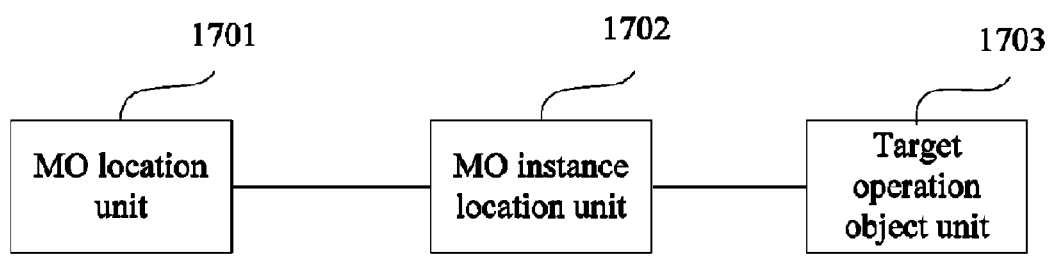
FIG. 17 is an architecture diagram of an embodiment of a processing unit 1602 of a DM client according to an embodiment of the present invention.

FIG. 17 is an architecture diagram of an embodiment of a processing unit 1602 of a DM client according to an embodiment of the present invention.

The processing unit 1602 includes an MO location unit 1701, an MO instance location unit 1702, and a target operation object unit 1703.

The MO location unit 1701 is configured to obtain a first URI of an MO instance root node matched with MO location information. There may be multiple or one first URI, or there may be no first URI.

The MO instance location unit 1702 is configured to match MO instance feature node information with feature node information of an MO instance corresponding to the first URI, and obtain a second URI of an MO instance root node corresponding to a successfully matched feature node.

The target operation object unit 1703 is configured to operate a target operation object according to target operation object information in a management command and the second URI. In an exemplary embodiment, the processing unit 1602 further includes a management sub-tree instance location unit, which is connected to the MO instance location unit 1702, and is configured to match a feature node of each management sub-tree instance of MO instance root nodes output from an MO instance location unit according to feature node information of a management sub-tree instance in the management command, and obtain a URI (that is, the second URI) of a management sub-tree instance root node corresponding to the feature node.

In an exemplary embodiment, a DM client further has a mapping table. The MO location unit matches a first URI of an MO according to the MO location information and the mapping table.

Figure 18:
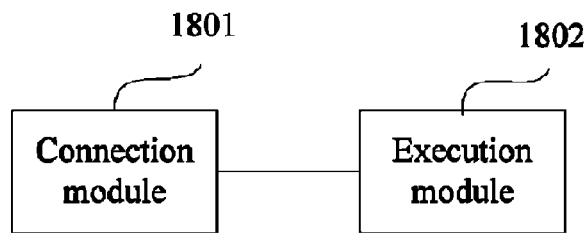
FIG. 18 is an architecture diagram of an embodiment of a target operation object unit 1703 of a DM client according to an embodiment of the present invention.

FIG. 18 is an architecture diagram of an embodiment of a target operation object unit 1703 of a DM client according to an embodiment of the present invention.

The target operation object unit further includes a connection module 1801 and an execution module 1802. The connection module 1801 is configured to connect a second URI to a relative URI of a target operation node, and obtain a URI of the target operation node.

The execution module 1802 is configured to operate the target operation node, or replace an MO instance corresponding to a successfully matched feature node with a TNDS object.

The DM client according to embodiments of the present invention is not limited to merely a mobile communication terminal, and may also include other communication devices complying with the DM protocol.

Embodiments of the present invention may have the following beneficial effects: A DM server may once locate and operate an MO without knowing specific position information of the MO, and therefore may avoid the problem that internal structures and instance names of terminals are not consistent especially when multiple terminals are managed at the same time. A DM client may find a corresponding target operation node in a DM tree in the DM client after receiving an incomplete management command. In this way, multiple communication steps between the DM client and the DM server are reduced, network resources are not required and the efficiency of the DM server configuring the DM client with a DM command is increased.

The objectives, technical solutions, and beneficial effects of the present invention have been described in further detail through the foregoing specific embodiments. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A communication system, comprising:
  a Device Management (DM) server configured to send a Delete command, wherein the Delete command comprises Management Object (MO) location information for identifying an MO, and feature node information for identifying an MO instance of the MO, and wherein a Target element is not specified in the Delete command; and
  a DM client configured to:
  receive the Delete command from the DM server,
  after receiving the Delete command, determine an absolute Uniform Resource Identifier (URI) of a root node of the MO instance according to the MO location information and the feature node information, wherein the absolute URI of the root node of the MO instance starts from a root node of a management tree,
  locate the root node of the MO instance according to the absolute URI of the root node of the MO instance, and
  delete the root node of the MO instance.

2. The communication system according to claim 1, wherein the feature node information is included in an element Filter of the Delete command.

3. The communication system according to claim 1, wherein the DM client is configured to:
  identify a plurality of MO instances according to the MO location information; and
  identify the MO instance from the plurality of instances according to the feature node information.

4. The communication system according to claim 3, wherein the MO location information includes a MO identifier (MOI), the feature node information includes a relative URI of a feature node in the MO instance and a value of the feature node.

5. The communication system according to claim 4, wherein the MO location information includes a MO identifier (MOI), the feature node information includes a node name of a feature node in the MO instance to be operated and a value of the feature node, and the target operation object information includes the relative URI of the target operation object.

* * * * *